Inventors
Otto Eckerle, Helmut Weinzierl
By Richard Low
Agt

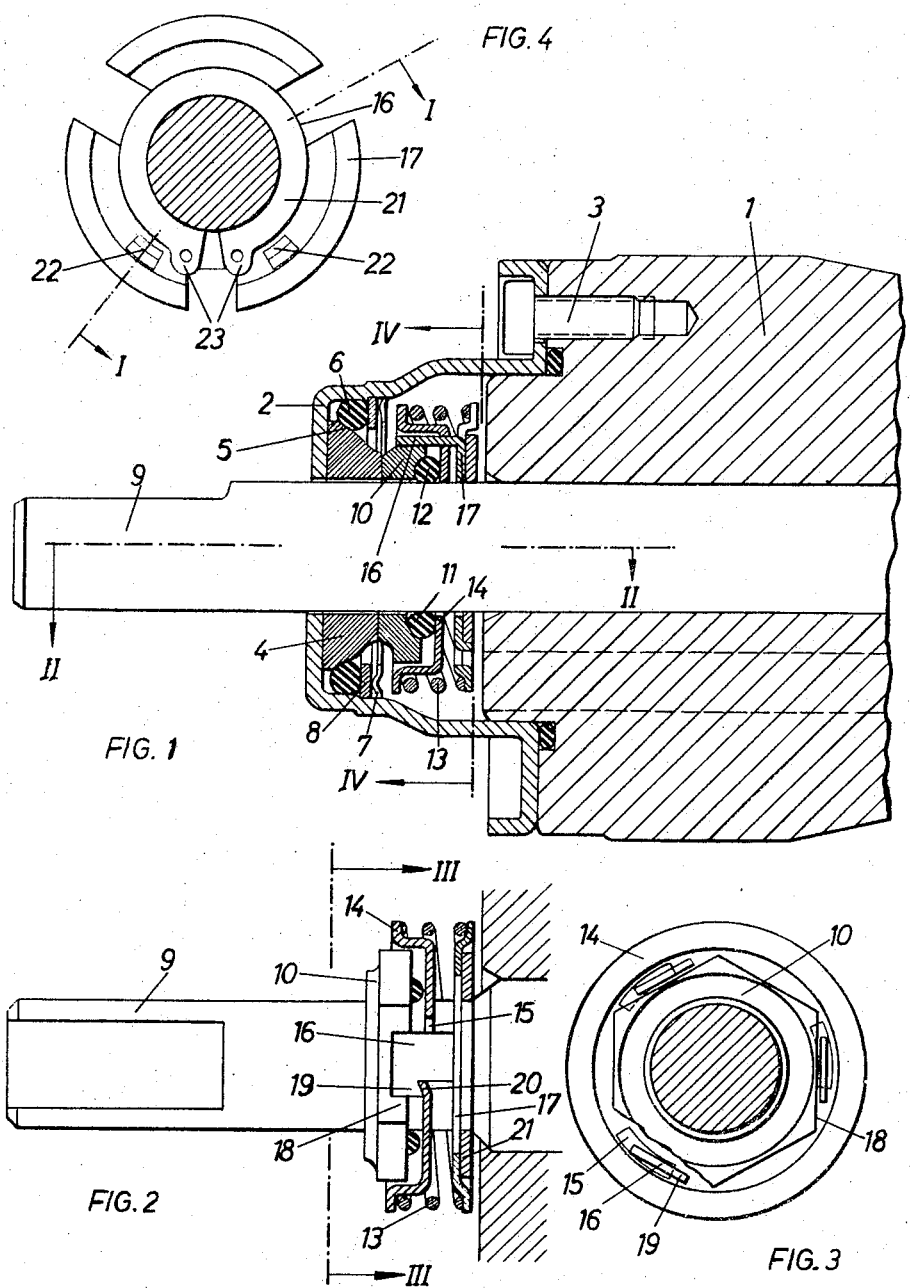

United States Patent Office 3,312,476
Patented Apr. 4, 1967

3,312,476
SLIDE RING SEAL
Otto Eckerle, 3 Am Bergwald, Malsch, Germany, and Helmut Weinzierl, Rastatt, Germany; said Weinzierl assignor to said Eckerle
Filed Oct. 16, 1964, Ser. No. 404,405
Claims priority, application Germany, Mar. 2, 1964, E 26,523; Apr. 16, 1964, E 26,848
9 Claims. (Cl. 277—87)

This invention relates to packings for the drive shafts of liquid-conveying pumps, and more particularly to a slide ring seal of a type useful for pumps that convey heating oil, hard water, or other liquid apt to form deposits in the packing.

Slide ring seals are not readily fouled by such deposits, but known slide ring seals are relatively complex and correspondingly difficult to assemble. An object of the invention is the provision of a slide ring seal which may be assembled by hand without the use of special tools. Another object is the provision of such a seal in which the stationary and rotating slide rings are perfectly aligned and centered at all times, and in which the two cooperating slide rings are safely secured to the drive shaft and to the pump housing respectively.

Another important object of the invention is the provision of a slide ring seal which employs slide rings of simple shape adapted to perform their function without requiring critically precise dimensioning so as to reduce the cost of the slide ring seal.

An additional object is the provision of a slide ring seal capable of employing slide rings of hard, rigid material, such as sintered ceramics, without requiring costly finishing operation.

With these and other objects in view, the invention in one of its aspects resides in a sealing arrangement in which a first slide ring is secured to the housing of the pump against rotation about its axis. A motion transmitting member is axially movable toward and away from the first slide ring member on the coaxial drive shaft of the pump which is journaled in the pump housing. Cooperating abutment means on the motion transmitting member and on the shaft limit axial movement of the motion transmitting member and secure the same against rotation relative to the shaft.

A second slide ring is interposed between the motion transmitting member and the first slide ring and has a peripheral engagement face. Yieldably resilient means arranged between the motion transmitting member and the second slide ring urge the latter axially toward the first slide ring into a position of engagement. Means provided on the motion transmitting member engage the afore-mentioned face of the second slide ring and thereby prevent relative rotation of the second slide ring and of the motion transmitting member about the axis of the drive shaft.

Other features and many of the attendant advantages of this invention will be readily appreciated as the same becomes better understood from the following detailed description of preferred embodiments when considered in conjunction with the appended drawings in which:

FIG. 1 shows a pump equipped with a slide ring seal of the invention in fragmentary axial section on the line I—I in FIG. 4;

FIG. 2 shows certain elements of the pump of FIG. 1 in elevation and partly in section on the line II—II;

FIG. 3 is a radially sectional view of the device of FIG. 2 taken on the line III—III, a portion of the structure being broken away to reveal details;

FIG. 4 shows the device of FIG. 2 in a radially sectional view corresponding to the line IV—IV in FIG. 1;

Figure 5:
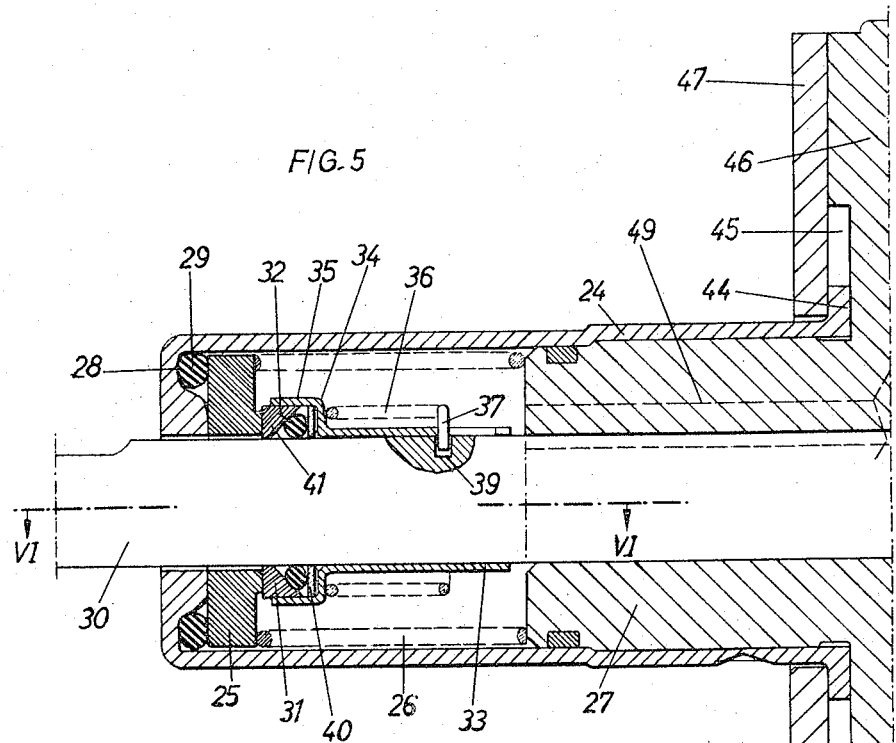
FIG. 5 shows another pump equipped with a seal of this invention in a view corresponding to that of FIG. 1.

Referring now to the drawing in detail, and initially to FIG. 1, the bearing neck 1 of a rotary pump, not itself relevant to this invention, carries a cup-shaped flanged casing 2, the neck and casing being elements of the stationary housing structure of the pump. The drive shaft 9 of the pump is journaled in the pump neck 1 and passes coaxially through the casing 2, the latter being attached to the remainder of the pump housing by screws 3.

A slide ring 4 of approximately frustoconical shape is arranged on the bottom of the casing 2 in such a manner that the conical face 5 of the ring defines an annular, axially tapering recess with a cylindrical wall of the casing 2. An annular gasket member 6 of the type commonly referred to as an O-ring is received in the recess, and is urged axially into the recess by a corrugated annular spring plate 7 which is held in position in the casing 2 by its resiliency. A washer 8 is interposed between the spring plate 7 and the O-ring 6.

The pressure of the plate 7 is uniformly distributed over the circumference of the O-ring 6 by the washer 8, whereby the slide ring 4 is firmly held against the bottom of the casing 2 and is coaxially centered within the latter.

A flat contact face of the stationary slide ring 4 perpendicular to the axis of the shaft 9 abuttingly engages a corresponding face of a rotating slide ring 10. A beveled internal face 11 of the latter defines an annular inwardly tapering groove about the shaft 9 on which the ring 10 is axially slidable. Another O-ring 12 is partly received in the groove and seals the ring 10 to the shaft. The O-ring 12 is being urged inward of the associated groove by a helical compression spring 13 which is retained between two annular spring caps 14, 17, and the slide ring 10 is thereby urged against the slide ring 4.

The elements of the seal which connect the slide ring 10 with the shaft 9 are also seen in FIGS. 2 to 4. The spring cap 14 has the shape of a flat cap whose circular bottom is centrally apertured for passing the shaft 9. Three circumferentially elongated slots 15 in the spring cap 14 are equiangularly spaced about the central aperture as best seen in FIG. 3. The spring 13 engages a peripheral flange of the cap 14, and an annular portion of the cap between the central aperture and the slots 15 abuts against the O-ring 12.

The spring cap 17 has a flat annular central portion. Three peripheral portions 16 of the cap are offset at right angles from the central portion to constitute three flat prongs which pass axially through the slots 15 of the spring cap 14. As best seen in FIG. 2, each prong 16 is cut to form an abutment face 19 which is obliquely inclined relative to the axis of the shaft 9 in a tangential plane and cooperates with a conforming abutment portion 20 of the spring cap 14 to lock the two spring caps under the pressure of the spring 13 in the partly assembled condition of the apparatus shown in FIGS. 2 to 4.

The axial portion of the slide ring 10 adjacent the flat radial contact face thereof is of circular cross section and flares axially away from the contact face. The main axial portion of the slide ring 10 is of regular hexagonal cross section and thus has six flat peripheral faces 18. The prongs 16 engage respective faces 18 and thereby prevent relative rotation of the spring cap 17 and of the slide ring 10 while permitting relative axial movement under the urging of the spring 13 within the limits set by the abutment faces 19, 20. Axial movement of the spring caps and of the slide ring 10 also is limited by abutting engagement of the two spring caps 14, 17.

A collar 21 is fixedly fastened on the shaft 9 and carries two radial projections 23 (FIG. 4). Two integral lugs 22 are bent at right angles out of the central portion of the spring cap 17 on opposite circumferential sides of the projections 23 so as to limit relative rotation of the collar 21 and of the spring cap 17. When the shaft 9 rotates, the spring cap 17 thus moves with the shaft and transmits the rotation of the latter to the slide ring 10 by engagement of the flat faces of the prongs 16 with the flat faces 18 of the ring 10.

In assembling the sealing arrangement of the invention with the pump, the spring 13 is placed between the flanges of the spring caps 14, 17. The two caps are then rotated relative to each other until the prongs 16 are aligned with the slots 15. The spring 13 is compressed between the caps 14, 17 until the abutment face 19 clears the cap 14, whereupon the caps are rotated for axial alignment of the faces 19 with the portions 20. Upon relaxation of external pressure, the spring 13 locks the caps 14, 17 in the position shown in FIG. 2 in which they can be slipped as a unit over the free end of the shaft 9 until the cap 17 abuts against the collar 21.

The slide ring 10 is next provided with the O-ring 12 and is positioned on the shaft 9 between the prongs 16, whereby the partial assembly illustrated in FIG. 2 is completed.

The slide ring 4 is placed in the bottom of the casing 2, and is centered therein by insertion of the O-ring 6. The ring 4 is secured in the centered position by means of the washer 8 and spring plate 7, whereupon the casing is placed on the pump neck 1 and is attached by means of the screws 3. The axial dimensions of the sealing arrangement are selected in such a manner that tightening of the screws 3 causes compression of the spring 13 and disengagement of the abutment faces 19 from the abutment portions 20. The axially movable elements 10, 12, 14, 17 of the sealing arrangement are thus held in abutting engagement between the contact face of the slide ring 4 and the fixed collar 21 by the force of the spring 13.

A screw driver is the only tool needed for assembling or disassembling the slide ring seal of the invention, and the screws 3 may be provided with heads that can be turned without a screw driver if this should be desired. The interengagement of projections and recesses on the motion transmitting spring cap 17 and on cooperating elements ensures rotation of the slide ring 10 with the shaft 9. The slide ring 4 is properly centered in the casing 2 without the need for precise dimensional tolerances.

The contact faces of the two slide rings are preferably lapped for tight sealing engagement. Since these faces are flat, a satisfactory finish is readily achieved. The surface finish and the dimensions of all other faces of the slide rings are not critical, thereby permitting the use of very rigid materials such as ceramices formed by molding and sintering ceramic grains. Alumina is an example of a suitable material. Such slide rings can be mass produced at very low cost.

Figures 6, 7:
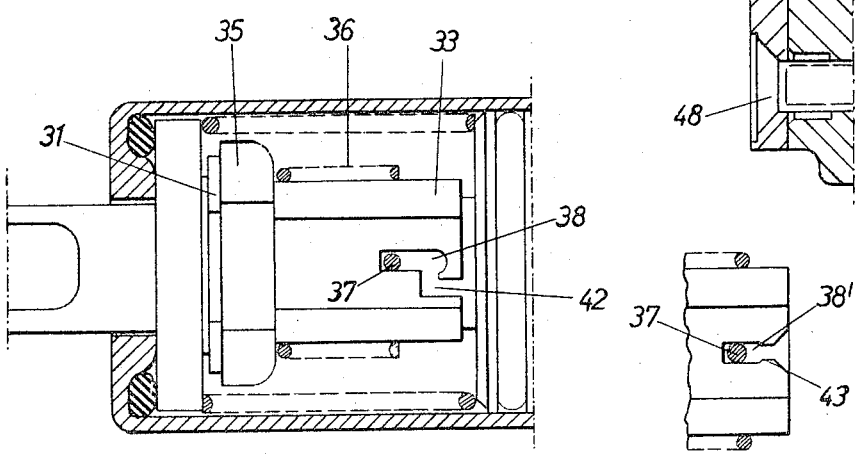
FIG. 6 shows the apparatus of FIG. 5 in axial section on the line VI—VI.
FIG. 7 shows a modification of a detail of the apparatus of FIG. 6.

FIGS. 5 and 6 show a modified sealing arrangement of the invention in which the sealing elements are retained in a cup shaped casing 24. A stationary slide ring 25 which has two flat parallel radial faces is held in fixed abutting engagement with the bottom of the casing 24 by a helical compression spring 26 which is axially interposed between the ring 25 and an end face of the pump neck 27. An annular, axially tapering groove 28 in the casing bottom receives an O-ring 29 which is urged into the narrow part of the groove 28 by the slide ring 25.

A drive shaft 30 which is journaled in the pump neck 27 passes freely through aligned central openings in the slide ring 25, the casing 24, and a rotating slide ring 31. As seen in FIG. 6, the rotating slide ring is of hexagonal cross section. It is internally conically beveled to form an axially tapering groove with the shaft 30. An O-ring 32 is received in the groove.

A sleeve 33 has a narrower main portion which is coaxially arranged on the shaft 30 and dimensioned so as to be freely movable thereon. A radial shoulder 34 integrally connects the narrower sleeve portion with an enlarged end portion 35. The hexagonal cross section of the sleeve is evident from FIG. 6. The end portion 35 conformingly envelops the slide ring 31 with sufficient clearance to permit relative axial movement. One end of a helical compression spring 36 wound on the narrower portion of the sleeve 33 axially abuts against the shoulder 34 whereas the other end 37 is bent toward the axis of the shaft 30. It passes through an axially elongated slot 38 in the sleeve 33 into a blind radial bore 39 in the shaft.

The pressure of the spring 36 thus urges the sleeve 33 toward the stationary slide ring 25. The spring pressure is transmitted to the O-ring 32 by a washer 40 which is interposed between the ring and the shoulder 34, whereby the O-ring is urged inward of the tapering groove between the conical face 41 of the rotating slide ring 31 and the shaft 30, and the rotating slide ring 31 is held in sealing engagement with the stationary slide ring 25.

Because of the conforming engagement of the six flat faces on the sleeve portion 35 with the corresponding faces of the slide ring 31, the rotation of the shaft 30 is transmitted to the slide ring 31 by the sleeve 33. Axial movement of the latter on the shaft 30 is limited by abutment of the spring end 37 with the two circumferential end walls of the slot 38. A slot 42 which extends inward from the axial end of the narrower sleeve portion is circumferentially offset from the slot 38 and communicates with a portion of the latter axially spaced from both end walls to permit convenient assembly and disassembly of the sealing arrangement in an obvious manner.

A modification of the sleeve 33 illustrated in FIG. 7 provides an axially elongated slot 38' for radial passage of the spring end 37, and unintentional escape of the spring from the open axial end of the slot 38' is prevented by lateral projections 43 whose spacing is slightly smaller than the diameter of the spring wire. The sleeve 33 is of sufficiently resilient metallic material to permit manual assembly and disassembly of the sealing arrangement of FIG. 7.

The casing 24 carries several radially projecting flange segments 44 which are retained in corresponding recesses 45 of the pump housing 46 by an annular flat disc 47 attached to the pump housing by several screws 48 of which only one is seen in the drawing. A bore 49 in the pump neck 27 connects the space within the casing 24 with the main pump space for return of liquid that may have leaked through the bearing in the pump neck.

The sealing arrangement shown in FIGS. 5 to 7 is assembled by first mounting the spring 36 on the shaft 30. The sleeve 33, washer 40, O-ring 32, and slide ring 31 are then placed in the positions shown in FIG. 5 in the order indicated. The O-ring 29, slide ring 25, and spring 26 are arranged in the casing 24, and the shaft 30 is pased through the aligned openings in the slide ring 25 and the casing 24 until the flange segments 44 enter the recesses 45, whereupon the assembly is secured by the annular disc 47 and the screws 48.

While the invention has been described with reference to specific embodiments, many variations and modifications will readily suggest themselves to those skilled in the art on the basis of these teachings. It will therefore be understood that the invention is not limited to the specific examples chosen for the purpose of the disclosure but embraces such modifications thereof as are within the scope of the appended claims.

What is claimed is:
1. A sealing arrangement comprising
 (a) housing means having an axis,
 (b) a shaft member journaled in said housing means for rotation about said axis,
 (c) a first slide ring member substantially coaxially disposed within said housing means,
 (d) first resilient means axially urging said first slide ring member against a portion of said housing means and securing said first slide ring member against rotation about said axis,
(e) a second slide ring member substantially coaxially disposed within said housing means,
(f) second resilient means axially urging said second slide ring member toward said first slide ring member into sealing engagement therewith,
(g) a motion transmitting member axially movable and rotatable with said shaft member, and
(h) complementary engaging means on said second slide ring member and said motion transmitting member, transmitting the rotary motion of said motion transmitting member to said second slide ring member.

2. In the arrangement as set forth in claim 1, cooperating abutment means on said motion transmitting member and on said shaft member for limiting axial movement of said motion transmitting member and for securing said motion transmitting member against rotation relative to said shaft member.

3. In the arrangement as set forth in claim 1, said engaging means including a plurality of face portions of said motion transmitting member, said second slide ring member having a peripheral non-circular engagement face, said face portions conformingly engaging said engagement face.

4. In the arrangement as set forth in claim 1, said first resilient means being constituted by an annular spring plate.

5. In the arrangement as set forth in claim 1, said second resilient means including a first annular spring cap encircling said second slide ring member, and a helical compression spring surrounding said first annular spring cap, said motion transmitting member being formed as a second annular spring cap, said first and second annular spring caps and said helical compression spring forming a separable assemblage.

6. An arrangement as set forth in claim 2, wherein said motion transmitting member is formed with an axially elongated slot and has a circumferentially extending end wall in said slot, said shaft member being formed with a radial bore, said second resilient means including a spring member having a free end portion radially extending through said slot into said bore, said end portion and said end wall jointly constituting said abutment means.

7. An arrangement as set forth in claim 5, wherein said engagement means include a plurality of axially extending prongs on said motion transmitting member, said first spring cap being formed with passages movably receiving said prongs.

8. In an arrangement as set forth in claim 7, abutment means which includes respective abutment portions on said motion transmitting member and on said first spring cap.

9. In an arrangement as set forth in claim 7, abutment means which includes a collar fixed on said shaft member, said motion transmitting member and said collar constituting a pair of members, one member of said pair being formed with a recess and the other member having a projection circumferentially engaging said one member in said recess thereof.

References Cited by the Examiner

UNITED STATES PATENTS

| 2,760,794 | 8/1956 | Hartranft | 277—87 |
| 2,853,323 | 9/1958 | Engelking | 277—237 X |

FOREIGN PATENTS

| 687,711 | 6/1964 | Canada. |
| 883,264 | 3/1943 | France. |
| 1,020,273 | 11/1952 | France. |
| 1,141,040 | 3/1957 | France. |

LAVERNE D. GEIGER, *Primary Examiner.*

J. MEDNICK, *Assistant Examiner.*